Oct. 12, 1948.   R. W. ERDLE   2,450,885
MEANS FOR AND METHOD OF MAKING ARTIFICIAL TEETH
Filed Feb. 17, 1944
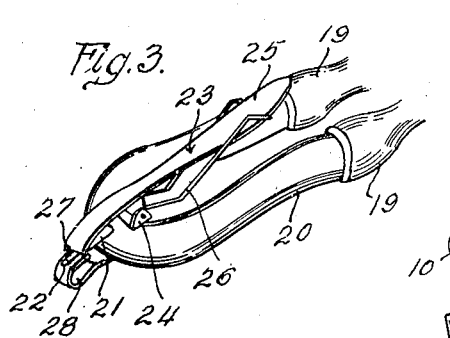
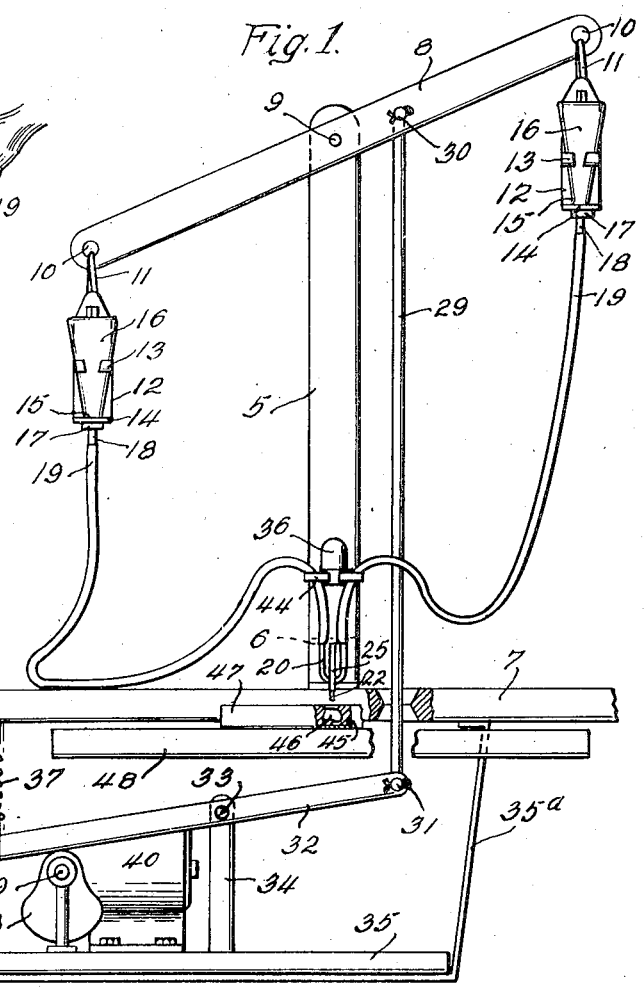
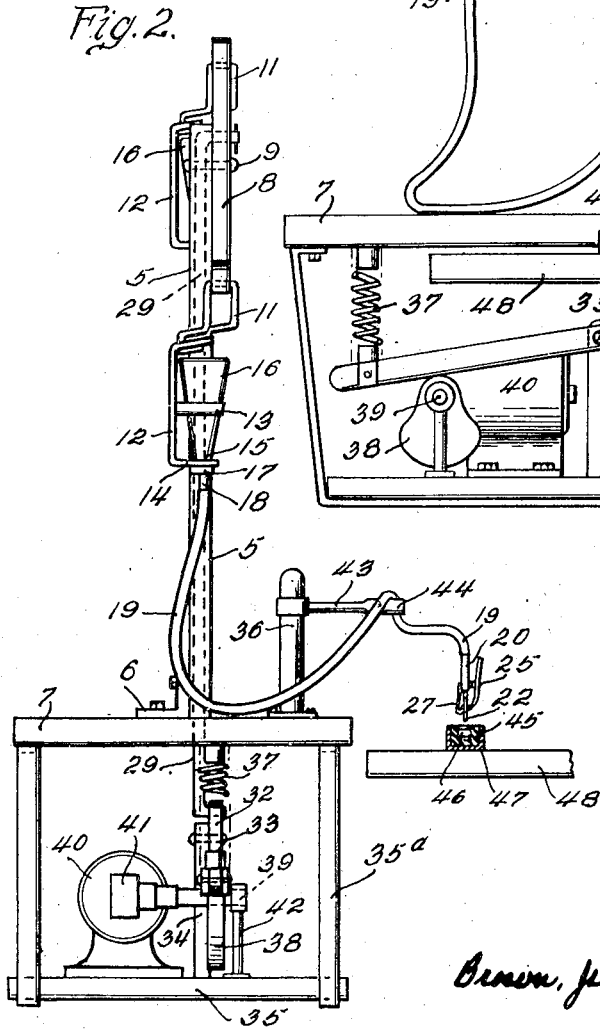
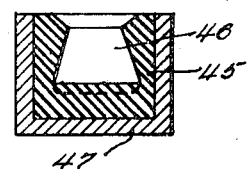
INVENTOR.
Reiner W. Erdle
BY
Attys.

UNITED STATES PATENT OFFICE 2,450,885

MEANS FOR AND METHOD OF MAKING ARTIFICIAL TEETH

Reiner W. Erdle, Chicago, Ill., assignor to Dental Research Corporation, Chicago, Ill., a corporation of Illinois Application February 17, 1944, Serial No. 522,706

12 Claims. (Cl. 25—156)

This invention relates, generally, to the production of ceramic articles, and has particular relation to the production of artificial teeth and ceramic articles of like character.

In my prior U. S. Patent No. 2,196,258, issued April 9, 1940, entitled Method of forming ceramic articles, I have disclosed and claimed a method of making articles of the class described which comprises introducing a mixture of finely ground porcelain and water or other binder into a flexible mold, compacting such mixture in the mold by vibration to the form of a firm body, removing the body thus compacted from the mold, and, subsequent to removal from the mold, firing said body simultaneously to fire-harden or to vitrify and glaze the same.

In my prior United States Patent No. 2,337,036, issued December 21, 1943, entitled Resilient mold and method of forming same, I have disclosed and claim a type of flexible mold which has proved most satisfactory and useful for forming and shaping artificial teeth.

By following the teachings of my above mentioned prior patents it is possible to produce artificial teeth and ceramic articles of like character of a very high degree of density. This is highly desirable from the standpoint of attaining superior physical properties of the resulting porcelain. Since compacting of the ceramic material, such as porcelain, is brought about by vibration, careful control of the grinding of the initial porcelain material is essential in order to produce a material of known grain size. A controlled grind is preferable in order to provide an assortment of grain sizes wherein the more finely ground particles fill the interstices between the coarser fractions or particles in order to produce a dense tooth or other ceramic article. The packing behavior of a porcelain and distilled water mix or other media under vibration will depend not only upon the grain sizes of porcelain present, but also upon the consistency of the mixture as determined by the ratio of weight of porcelain powder to water or other media.

The delicate shades of porcelain required for duplicating the colors found in natural teeth are obtained by blending independently processed batches of colored and uncolored porcelain to produce the desired color in the fired tooth. Unless the porcelain mix as introduced into the various tooth forming cavities of the mold is uniform at all times, which means that there is present the proper selection of previously determined grain or particle sizes, variation will occur from tooth to tooth across production runs, both as to density of the fired product as well as the shade or color value of same. The matter of introducing a uniform porcelain mix into the various mold cavities, heretofore has presented a difficult practical problem. In an effort to solve this difficult problem, I have in prior methods resorted to the use of three differently colored porcelains for any given shade of tooth. The one is introduced first into the tooth forming cavities of the mold to produce the desired incisal color, the second for the purpose of producing the desired color value in the middle third of the tooth, and the third colored porcelain for producing the gingival portion of the tooth; compacting same under vibration and simultaneously blending to a slight degree the three component colors of the desired shade of tooth and subsequently removing same from the mold after compacting and firing to a suitable temperature for vitrification and self glaze.

Heretofore the mixture of ceramic material, such as porcelain and water, has been prepared and introduced into the mold cavity in different ways.

According to one prior scheme, water and dry porcelain powder were introduced into a suitable container and stirred with a small spatula to produce a uniform mixture of porcelain and water of a predetermined consistency. I have found it practical to transfer the prepared porcelain, as above described, from the container to the cavity of the tooth mold by an eye-dropper, spoon or the like.

According to another scheme, I have found it practical to prepare the porcelain for forming artificial teeth by intimately mixing a predetermined quantity of finely ground porcelain and water in a suitable receptacle and allowing the same to pack down and compact by vibration. The excess liquid is removed after the porcelain has packed down to a considerable state of firmness. In filling the cavity of the tooth mold a small amount of water is added to the compacted porcelain in the receptacle, for example, by an eye-dropper. A suitable spatula is used for transferring the porcelain from the receptacle to the mold cavity, the end of the spatula being rather small and spoon or cup-shaped to retain a small quantity of the porcelain-water mix for filling the mold cavity.

In using the first of the foregoing schemes it is necessary to repeatedly stir or otherwise agitate the mixture of finely ground porcelain and water to prevent settling, segregation or classification of the various grain sizes of the porcelain which are used to produce the desired density in the finished tooth or other article. Moreover, any pause or pauses of different length by the operator between removal of the prepared porcelain from the container in which same is mixed and introduction into the mold cavity introduces a factor which, unless given careful attention by a skilled operator, tends to make the coloring or shading of the tooth different from that intended, or results in lack of uniformity in the coloring or shading of a commercial run of teeth intended to be of the same shade or color.

The second of the above mentioned schemes affords certain advantages in the production of custom made teeth, but it is relatively slow and requires great care and skill on the part of the operator. In order to have a representative range of particle sizes in the procelain-water mix, it is necessary in successfully carrying out this process to remove the porcelain material from the receptacle in which it is prepared for introduction into the mold cavity by an upward motion of the spatula from the bottom of the receptacle where the coarser particles are present upward and across the face of the prepared porcelain to the upper surface where porcelain of intermediate and finer grain size is picked up. Moreover, in order to provide different shades or colors at the incisal, middle third, gingival or other portions of the porcelain tooth, several differently colored prepared batches of porcelain must be used, and the different colors or shades at different portions of the ultimately fired tooth depend upon the skill of the operator and the care exercised in introducing the porcelain mix into the mold cavity.

Variations inherently result both as to density and shade of the finished formed tooth because of the inability of various operators accurately to control the consistency of the porcelain mix as it is introduced into the mold cavity, and accurately to fill each and every mold cavity to the identically same level or amount with the component colors forming the incisal third, middle third, and gingival portion of the tooth. This problem of duplicating in large production a given shade of tooth is further complicated by the wide variety of widths and lengths of artificial teeth which must be produced to meet the requirements to simulate in artificial teeth these same variations as found in nature.

The object of the present invention is to provide an improved method and means for use in forming artificial teeth and ceramic articles of like character, with novel and improved results.

The present invention is particularly designed to produce, from a single porcelain mix containing porcelain particles some of which are coarse as compared with other particles and on a commercial basis, artificial teeth that will have uniformity in density and which will uniformly simulate the shading and distribution of color commonly found in natural teeth.

In this single porcelain mix, there is present an assortment of grain sizes, varying from coarse to fine, and during the course of compacting this porcelain and distilled water mix under vibration, the coarsest particles or fractions tend to settle more rapidly into the lowest portions of the mold cavities, the intermediate sizes of particle subsequently settling and filling out the middle portion of the mold cavity with the finest particles present settling and compacting to produce the upper or the gingival section of the tooth mold. During the vibration period, the finer porcelain particles fill in between the coarser particles.

The delicate shades of porcelain required are produced through the processing of the porcelain wherein the coarsest fractions produce the desired color in the incisal portion of the tooth, the intermediate fractions the desired color or shade of the middle portion of the tooth and the fine particles the desired shade or color of the gingival portion of the tooth. During the course of vibrating, the particles are compacted, with the finer particles filling in the spaces between the coarser particles, resulting in a delicate overall blending of the tooth.

In order to use a single porcelain mix, it is essential that a representative lot of the porcelain-water mix be introduced into the tooth mold cavity at one time. This may be accomplished by continuously agitating the porcelain mix in a suitable container, withdrawing a small portion of this mix by means of an eye dropper, spoon, or other suitable means, and introducing same in its entirety at one time into the tooth mold cavity. This procedure is satisfactory for small scale production. For large scale production wherein speed and efficiency and uniformity of shade are of prime importance, I provide for continuously agitating or circulating the porcelain mix in a manner to keep the porcelain in a continuous state of suspension up to and including the moment of its entry into the mold cavity. This eliminates all chance for pause, settling, or classification of the coarse porcelain particles in a single porcelain mix containing such particles. As a result, uniformity in shade and density is produced across mass production of artificial teeth from a single porcelain mix containing coarse particles of porcelain. The improved definiteness of shade and density can be readily reproduced on a production basis, and the results are not dependent upon the skill of the operator in introducing the porcelain mix into the mold cavities.

Moreover, it will be obvious that the commercial production of teeth in accordance with the present invention can be accomplished with greater speed, and that the time required for training the operator is greatly reduced.

In one specific embodiment of my invention I attain the foregoing results and other advantages which will presently appear by providing a flexible conduit communicating at its ends with containers for the porcelain mix, these containers being alternately raised and lowered one relative to the other so as to cause circulation of the mix through the conduit first in one direction and then in the other direction, this conduit being provided with means for withdrawing therefrom, at a place where the porcelain is thus maintained in continuous suspension and in the desired amount, the porcelain mix circulating through the conduit.

Further objects and advantages of my invention will appear from the following detailed description.

In the drawings:

Figure 1 is a front view, partly broken away and in section, of means embodying my invention for circulating a porcelain mix through a conduit, showing a mold into the cavities of which the porcelain mix is to be deposited and a vibrating table for the mold, the latter being shown fragmentarily and the mold being shown in part in lengthwise section;

Figure 2 is a side view, with parts broken away, of the circulating means of Figure 1;

Figure 3 is a detail perspective view, on an enlarged scale, of the elbow included in the conduit, and the associated spring clip; and Figure 4 is a transverse sectional view, on an enlarged scale, through the mold and the channel containing member therefor, taken through one of the mold cavities.

In the accompanying drawings I have shown, by way of example, one form of means which has proven satisfactory and useful for keeping the porcelain in a continuous state of suspension up to and during entry into the mold cavity. An upright 5 is rigidly mounted, conveniently by means of an angle bracket 6, on a table 7 and extends upward therefrom. An arm 8 is centrally pivoted at 9 to upright 5, adjacent the upper end thereof, for rocking movement about a horizontal axis. This arm is provided, adjacent each end, with an opening 10 which loosely receives a loop member 11 attached to a depending substantially U-shaped frame 12 provided, at its mid-length, with a resilient split collar 13 secured at its mid-portion to frame 12. Lower arm 14 of frame 12 is provided with a suitable opening therethrough for receiving the neck 15 of a downwardly tapering bottle or like container 16, closed at its lower end by a screw cap 17 from which extends a nipple 18. As will be noted more clearly from Figure 2, the loop members 11 are each offset rearward of arm 8 so that the axes of the bottle 16 are substantially in the plane of the rearward face of arm 8, to avoid any objectionable tendency to tilting of the bottles.

A suitable length of flexible hose 19 is secured at one end over the nipple 18 of each of the bottles 16, and the other ends of the hose lengths 19 are secured over the arms of a U-shaped member or elbow 20 of tubular form, which may be made of a suitable resin, glass, or any other suitable material. Elbow 20 is provided, intermediate its ends, with a nipple 21 over which is secured a short length of rubber tubing 22. A spring clip 23, of known type, is suitably mounted on elbow 20, by means of a bracket 24 secured thereto, this clip comprising an operating arm 25 pivoted on bracket 24 and urged in one direction about its pivot axis by a wire spring 26. Arm 25 is provided with a clamping jaw 27, cooperating with a jaw member 28 mounted on elbow 20 for pinching or compressing the rubber tube 22 and thereby closing it for preventing discharge therethrough from elbow 20.

A rod 29 is pivoted at its upper end, at 30, to arm 8, adjacent and to one side of upright 5, the lower end of this rod being pivoted, at 31, to one end of a lever 32 pivoted between its ends at 33, to a bracket 34 secured to and extending upward from a platform 35 supported by brackets 35a secured to and depending from the under face of table 7. The other end of lever 32 is urged downward by a compression spring 37 confined between lever 32 and the underface of table 7, suitable centering studs being secured to table 7 and to lever 32 and extending into the ends of spring 37. The lower edge of the free end portion of lever 32 bears upon the periphery of a cam 38 secured upon a shaft 39 driven by an electric motor 40 mounted on platform 35, through a speed reducing unit 41 associated with motor 40. Shaft 39 projects forwardly beyond cam 38 and has its outer end portion mounted in a bearing bracket 42 secured to and extending upward from the platform 35. A stand 36 is mounted on table 7, in front of upright 5, and has secured thereto an arm 43 provided at its forward end with an open loop or collar 44 which receives the portions of hose length 19 adjacent elbow 20. The collar 44 holds the hose lengths 19 securely but without causing pinching or collapsing thereof such as would interfere with free flow therethrough of a liquid suspension of finely ground porcelain. When the hose lengths 19 are thus supported by collar 44, the elbow 20 and a short extent of the hose lengths depend from the collar 44 in overhanging relation to a resilient mold 45, provided with a plurality of mold cavities 46.

The mold 45, which may be of the character more fully disclosed in my prior U. S. Patent No. 2,337,036, issued December 21, 1943, preferably is disposed within a metal retaining channel member 47 fitting snugly thereabout, this channel member and the mold being supported by a vibrating table or support 48 disposed in front of and adjacent table 7. In Figure 1 the table 48 is shown as being at a lower level than the table 7, for clearness of illustration, it being understood that the tables 7 and 48 may be disposed in a common plane or in different planes, as desired. The portions of the hose lengths 19 extend below the collar or loop 44 a proper distance such that the lower end of tube 22 is disposed but a short distance above the upper face of the mold 45. This mold is moved along the table or support 48 so as to bring the cavities 46 successively in position beneath the tube 22, for discharge therefrom into the underlying cavity of a suitable quantity of the porcelain mix.

The bottles or containers 16 are filled to a proper extent with a mixture of finely ground porcelain and water or other suitable liquid, this mixture also filling the hose lengths 19 and the elbow 20 which, together, constitute a continuous conduit connected at its ends to the respective containers 16. When the motor 40 is in operation the cam 38 is rotated at low speed and, in conjunction with the compression spring 37, causes oscillation of arm 8 about its pivot 9. In one position of cam 38 one of the bottles or containers 16 is in its lowermost position and the other bottle 16 is in its uppermost position, as shown in Figure 1. In the continued rotation of the cam the lever 32 is moved from its full line position to its dotted line position, at which time the left hand bottle 16 is in its uppermost position and the right hand bottle 16 is in its lowermost position. In that manner, the bottles or containers 16 are alternately raised and lowered in opposite relation. As the positions of the bottles are reversed, the flow of the liquid porcelain mix from one bottle to the other is reversed. It will be apparent that, in the continued oscillation of arm 8, the porcelain mix is caused to flow in alternately opposite directions from one of the bottles 16 to the other thereof, through the conduit comprising the hose lengths 19 and the elbow 20. This keeps the porcelain in a continuous state of suspension up to where it enters the mold cavity and at the time it enters the mold cavity.

In the operation of the illustrated embodiment of the invention the bottles 16 do not continuously move from their highest to their lowest positions. Instead, and in order that the porcelain mix be kept in continuous circulation, the bottles 16 remain stationary at the limits of their movement so that all of the mix may substantially pass from the highest bottle into the lowest bottle. As this is substantially completed the cam, as shown in the drawing, changes the positions of the bottles so that the lowest bottle then becomes the highest bottle and remains in this position until all of the porcelain mix has drained from it, after which the cam again reverses the positions of the bottles.

The bottles 16 are downwardly tapering and more or less funnel-shaped, and any particles of porcelain tending to settle-out therein will be caused to flow upwards in the bottle by the entering stream of liquid. The assembly construction at which the rubber hose is connected to the exit end 17 of the tapered bottle is such as to provide no shoulder upon which any porcelain particles could accumulate. As the porcelain mix drains from a bottle, again no shoulder is provided and the passageway is continuous from the inside of the bottle into the connecting tube. In that manner, any porcelain particles tending to settle at the lower end or neck of either of the bottles is caused to travel upward therein so as to be thoroughly dispersed throughout the liquid within the bottle. Further, as noted, the porcelain mix within the conduit is continuously circulated therethrough in alternately opposite directions, such circulation being effective for preventing precipitation or settling out from the porcelain mix of particles of porcelain.

When it is desired to fill a cavity 46 of the mold 45, the mold is positioned with the cavity directly beneath the rubber tube or tip 22, as shown in Figure 1. The arm 25 of the clip is then depressed, thus opening the tip 22 and permitting discharge therethrough of the porcelain mix, this mix being drawn from the stream flowing through the conduit while that stream is being circulated through the conduit in the manner stated, thereby assuring that the porcelain mix delivered into the cavity 46 will be uniform with respect to the distribution therein of the particles of ground porcelain. The table or support 48 is continuously vibrated, by suitable known means (not shown), so that as the porcelain mix is deposited in the mold cavity 46, the particles of porcelain are compacted within the cavity 46 thereby expelling the water and air therefrom so as to produce a tightly packed uniform body of porcelain of high density. By continuously circulating the porcelain mix through the conduit and withdrawing from this circulating stream appropriate amounts of the porcelain mix and depositing it directly in the mold cavities while circulation of the mix continues, I eliminate possibility of stratification of the porcelain particles, and render it possible to produce cast porcelain teeth and analogous articles formed of porcelain of high density and of uniform shade or color value while possessing after firing, comparatively high mechanical strength.

It will be understood that, within the broader aspects of my invention, any suitable means other than the specific means illustrated may be employed for circulating the porcelain mix through a conduit or equivalent member from which this mix is withdrawn and deposited in the mold cavities. The means of my invention comprises, broadly, means whereby the porcelain mix may be circulated and agitated in the manner described and whereby desired amounts of this mix may be withdrawn from the circulating stream and deposited in mold cavities. The method of my invention comprises broadly circulating or agitating the porcelain mix in a manner to keep the porcelain in a continuous state of suspension up to where it enters the mold cavity and during its entry into the mold cavity. It will be understood, by those skilled in the art, that changes in detail, both as to the means and the method of my invention may be resorted to without departing from the scope and field of my invention, and I intend to include all such variations, as fall within the appended claims, in this application in which the preferred forms only of my invention have been disclosed.

My present invention distinguishes from schemes in which agitation of the porcelain mix must be discontinued in order to introduce the porcelain mix into the mold cavities, as well as from schemes which do not and cannot have continuous flow or circulation of the porcelain mix at all times and up to where the mix enters the mold cavity, as well as during the time the mix is introduced into such cavity.

It is to be understood that where two shaded porcelain mixes are employed the device will be provided with two pairs of bottles or containers 16, one pair for each porcelain mix, and each pair being provided with the connecting tubes and valved outlets as shown and described.

In the illustrated embodiment of the invention, the nipple 21 may be very short, and in fact it may be eliminated entirely by providing a porcelain mix outlet along the elbow 20 with an internally acting valve under the control of the operator. I contemplate, for control by such a valve, a tapered outlet at which there will be an eddy action further to maintain the porcelain particles in a continuous state of suspension up actually to where the porcelain mix enters the mold cavity.

I claim:

1. In conditioning and dispensing means of the character described, a flexible conduit for containing a fluid mix of a liquid and particles of matter suspended therein, means for alternately raising and lowering the ends of said conduit in opposite relation thereby circulating said mix in said conduit and maintaining the particles of matter in suspension in the liquid and distributed substantially uniformly therein, and means for withdrawing from the conduit desired quantities of said mix during circulation thereof.

2. In means for conditioning and dispensing a fluid mix of ground porcelain and a liquid, a pair of containers adapted to receive the mix, a conduit connecting the lower ends of said containers, means for alternately raising and lowering said containers in opposite relation thereby causing flow of the mix through the conduit in alternately opposite directions, said conduit being of a character to accommodate raising and lowering of said containers, and means between the ends of said conduit for withdrawing therefrom desired quantities of said mix during circulation therof through said conduit.

3. In means for conditioning and dispensing a fluid mix of ground porcelain and a liquid, a pair of containers adapted to receive the mix, a flexible conduit connected at its ends to the lower ends of said containers, means for alternately raising and lowering said containers in opposite relation thereby causing flow of the mix through said conduit in alternately opposite directions, and means between the ends of said conduit for withdrawing therefrom desired quantities of said mix during circulation thereof through said conduit.

4. In means for conditioning and dispensing a fluid mix of ground porcelain and a liquid, a pair of downwardly tapering containers adapted to receive the mix, a flexible conduit connected at its ends to the lower ends of said containers, means for alternately raising and lowering said containers in opposite relation thereby causing flow of the mix through said conduit in alternately opposite directions, and means between the ends of said conduit for withdrawing therefrom desired quantities of said mix during circulation thereof through said conduit.

5. In means for conditioning and dispensing a fluid mix of ground porcelain and a liquid, a pair of containers adapted to receive the mix, two flexible tubes respectively connected at their upper ends to the lower ends of said containers, a tubular member connecting the lower ends of said tubes and constituting therewith a conduit establishing communication between said containers, means for alternately raising and lowering said containers in opposite relation, and means carried by said tubular member for optionally withdrawing desired quantities of the mix circulating therethrough.

6. In means for conditioning and dispensing a fluid mix of ground porcelain and a liquid, a pair of containers adapted to receive the mix, two flexible tubes respectively connected at their upper ends to the lower ends of said containers, a tubular elbow connecting the lower ends of said tubes and constituting therewith a conduit establishing communication between said containers, means for alternately raising and lowering said containers in opposite relation, and means carried by said elbow for optionally withdrawing desired quantities of the mix circulating therethrough.

7. The method of charging a mold cavity with a porcelain-like mix, which comprises moving a body of fluid mix of a liquid and ground porcelain-like material back and forth in a conduit having a discharge outlet adapted to be positioned immediately adjacent to the inlet to the mold cavity, and, during the back and forth movement of said mix in said conduit and while the porcelain-like particles are maintained by such movement in a substantially complete state of suspension in the liquid content of the mix, introducing the mix from the conduit into the mold cavity through said discharge outlet.

8. In apparatus of the class described, in combination, a tubular conduit for holding a fluid mix of a liquid and particles of matter suspended therein, said conduit having a discharge outlet within its length for discharging quantities of the mix from the conduit, and means for moving the end portions of said conduit endwise to move the mix back and forth in the conduit to maintain the particles in a substantially complete state of suspension in the liquid.

9. In apparatus of the class described, in combination, a tubular conduit for holding a fluid mix of a liquid and particles of matter suspended therein, said conduit having a discharge outlet within its length for discharging quantities of the mix from the conduit, and means for moving the end portions of said conduit endwise to move the mix back and forth in the conduit during discharge of the mix from the conduit and when the mix is not being discharged from the conduit to maintain the particles in a substantially complete state of suspension in the liquid.

10. In apparatus of the class described, in combination, a looped tubular conduit for holding a fluid mix of a liquid and particles of matter suspended therein, said conduit having a discharge outlet in the bight intermediate the ends of the conduit for discharging quantities of the mix from the conduit, and means for alternately raising and lowering the ends of the conduit in opposite relation to move the mix back and forth in said conduit to maintain the particles in a substantially complete state of suspension in the liquid.

11. In apparatus of the class described, in combination, a looped tubular conduit for holding a fluid mix of a liquid and particles of matter suspended therein, said conduit having a discharge outlet in the bight intermediate the ends of the conduit for discharging quantities of the mix from the conduit, means for alternately raising and lowering the ends of the conduit in opposite relation to move the mix back and forth in said conduit to maintain the particles in a substantially complete state of suspension in the liquid, and closure means operable to open and close said outlet.

12. In apparatus of the class described, in combination, a flexible looped conduit for holding a fluid mix of a liquid and particles of matter suspended therein, a flexible nipple providing a discharge outlet at the bight intermediate the ends of the conduit for discharging quantities of the mix from the conduit, means for alternately raising and lowering the ends of the conduit in opposite relation to move the mix back and forth in said conduit to maintain the particles in a substantially complete state of suspension in the liquid, and means for pinching said nipple to close the discharge outlet against the discharge of the mix from the conduit, said last means being operable to open said outlet for the discharge of quantities of the mix from the conduit.

REINER W. ERDLE.

REFERENCES CITED

The following references are of record in the file of this patent:

UNITED STATES PATENTS

| Number | Name | Date |
| --- | --- | --- |
| 942,355 | Scholz | Dec. 7, 1909 |
| 1,593,056 | Baker | July 20, 1926 |
| 1,694,563 | Ross et al. | Dec. 11, 1928 |
| 1,842,232 | Baker | Jan. 19, 1932 |
| 1,873,438 | Litchfield | Aug. 23, 1932 |
| 1,885,774 | Showers | Nov. 1, 1932 |
| 1,923,678 | Lowell | Aug. 22, 1933 |
| 2,134,361 | French | Oct. 25, 1938 |
| 2,194,633 | Bemis | Mar. 26, 1940 |
| 2,312,444 | Rochford et al. | Mar. 2, 1943 |

FOREIGN PATENTS

| Number | Country | Date |
| --- | --- | --- |
| 5,742 | Great Britain | Apr. 16, 1890 |